United States Patent [19]
Bida

[11] Patent Number: 4,883,554
[45] Date of Patent: Nov. 28, 1989

[54] PLAQUE AND METHOD OF MAKING SAME

[76] Inventor: Sam Bida, 2160 Crawford St., Ely, Nev. 89301

[21] Appl. No.: 100,356

[22] Filed: Sep. 23, 1987

[51] Int. Cl.[4] .............. B32B 31/00

[52] U.S. Cl. .............. 156/219; 27/1; 40/616; 40/630; 101/32; 156/220; 156/249; 156/253; 156/268; 156/277; 156/278; 156/280; 156/293; 400/127; 428/913.3

[58] Field of Search .............. 156/278, 280, 219, 220, 156/249, 277, 293, 253, 268; 428/913.3; 40/616, 630; 101/32; 27/1; 400/127

[56] References Cited

U.S. PATENT DOCUMENTS

| | | | |
|---|---|---|---|
| 1,640,787 | 8/1927 | Martin et al. | 101/32 |
| 2,835,014 | 5/1958 | Dioguardi | 27/1 |
| 3,124,064 | 3/1964 | Schick | 400/127 |
| 3,480,500 | 11/1969 | Hotter | 156/220 |
| 3,912,842 | 10/1975 | Swartz | 156/220 |

FOREIGN PATENT DOCUMENTS

| | | | |
|---|---|---|---|
| 15783 | 9/1928 | Australia | 400/127 |

*Primary Examiner*—John J. Gallagher
*Attorney, Agent, or Firm*—Watson, Cole, Grindle & Watson

[57] ABSTRACT

A thin sheet of metal foil is inserted in a typewriter and conventional typing strokes produce indentations therein. The ribbon of the typewriter contains material of a high degree of visibility which is deposited at the bottom of the indentations. A fixative ensures that the material is properly disposed in place. The sheet is mounted on a base and a layer of clear plastic is provided around the plaque. The plaque is removably mounted on a coffin by a pair of pins or brackets each of which includes portions disposed at an angle of about 45° to one another. Attaching means including a bracelet secures the plaque to the remains within the coffin.

16 Claims, 2 Drawing Sheets

PLAQUE AND METHOD OF MAKING SAME

BACKGROUND OF THE INVENTION

The invention relates to a plaque and method of making same, and more particularly to a plaque especially suited for use with a coffin and human remains disposed in a coffin to provide identification of the deceased and also suitable biographical information or an epitaph concerning the deceased. While designed primarily for use with human remains, the plaque may also be used, for example, with pets.

A plaque for the purpose of the invention must provide the information in such a manner that it may be easily read by observers at a viewing or a funeral. When the plaque is mounted on a coffin, persons standing next to the coffin can read the information, thereby placing such persons at ease and providing a suitable topic of conversation.

Plaques utilized for this purpose are designed to provide a permanent record of identification for posterity, and accordingly should be manufactured of materials which are virtually indestructible whereby the information thereon will be discernible far into the future. Plaques made of materials similar to the present invention are shown in U.S. Pat. Nos. 4,332,074 and 4,481,160. These patents disclose constructions employing decorative metal foil which is embossed and embedded in a clear plastic substance to protect the foil.

Means are provided for readily mounting and removing the plaque with respect to a coffin, while supporting the plaque in desired reading position when the plaque is mounted on the coffin. Furthermore, means are provided for permanently securing the plaque to the remains in the coffin subsequent to the funeral ceremony and prior to interment.

SUMMARY OF THE INVENTION

A novel method of making a plaque is provided wherein a thin sheet of metal foil has information inscribed into the upper viewing surface thereof by forming indentations into the viewing surface while providing material of a high degree of visibility in the bottom of the indentations. This is accomplished by inserting the sheet into a conventional typewriter and typing information onto the sheet by conventional typing strokes. The ribbon of the typewriter contains material of a high degree of visibility which is deposited at the bottom of the indentations. (A fixative is employed to ensure that the material is properly disposed in place.) The inscribed sheet is mounted on a base and a layer of transparent protective material is placed over the sheet and preferably in sealing relationship to the entire plaque.

The completed plaque is highly resistant to adverse ambient conditions due to the nature of the materials used and the overall construction thereof. Accordingly, the plaque serves to provide the desired information in a form which will withstand the rigors of time.

The indentations in the metal foil along with the high visibility material disposed at the bottom of the indentations produces a unique optical effect whereby the information is readily perceived by the human eye and an aesthetically favorable impression is made on an observer.

The invention also provides means for removably mounting the plaque on a coffin in the form of a plurality of pins the upper ends of which are received in holes in the plaque and the lower ends of which are detachably supported by the coffin. The upper ends of the pins are disposed at an angle of about 45° to the lower ends thereof so that the plaque will be supported in a plane which permits the information thereon to be easily read by persons standing adjacent to the coffin.

The pins can be quickly disengaged from the plaque and the coffin upon completion of the funeral ceremony. The plaque can then be placed within the coffin, and if desired may be secured to the remains to ensure that the plaque will continue to be associated with the remains.

The invention also includes means for securing the plaque to a portion of the remains. The securing means comprises fastening means adapted to be fastened to an attaching means in the form of a bolt affixed to the plaque. A chain has one end thereof connected to the fastening means and the opposite end thereof connected to a bracelet which can be secured to a portion of the remains such as the wrist.

DETAILED DESCRIPTION OF THE INVENTION

Figure 1A:
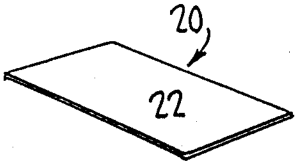
FIG. 1 is a schematic view of the various steps of the method of making the invention plaque.

Referring now to the drawings wherein like reference characters designate corresponding parts throughout the several views, FIGS. 1A to 1J illustrate the various steps of the invention. In FIG. 1A, a thin sheet of metal foil 20 is provided having an upper viewing surface 22. This sheet may be formed of various materials such as gold, brass, aluminum, copper, silver and platinum as well as alloys thereof, or other suitable metals or alloys thereof. The dimensions of the sheet are selected according to the desired size of the plaque, and for example may be eight inches in length and three inches in width. The thickness of the sheet is dependent on the material, and typically may be .0015 inches in the case of gold, aluminum.

Figure 1B:
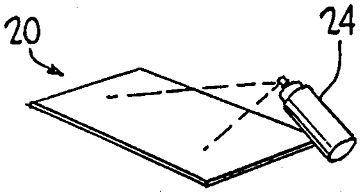

As shown in FIG. 1B, the viewing surface is then provided with a layer of (conventional artist's fixative) which may be of the interior-exterior matte workable type. As shown, the fixative is applied by a conventional spray can device 24. The fixative is then allowed to set for a suitable period of time of about ten minutes.

Figure 1C:
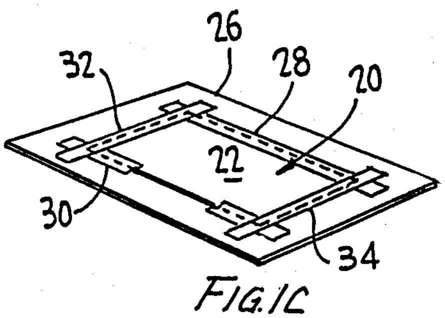

The sheet of metal foil is then secured to a supporting sheet of material such as paper which is sufficiently flexible as to be inserted in a conventional typewriter. As seen in FIG. 1C, a sheet of typing paper 26 is provided of greater dimensions than the sheet of metal foil 20. The upper and lower peripheral edge portions of the sheet of metal foil are secured to the sheet of paper by means of strips of conventional pressure sensitive tape 28 and 30. The opposite side peripheral edge portions of the sheet of metal foil are secured to the sheet of paper by further similar strips of tape 32 and 34. It will be noted that the central major portion of the sheet of metal foil is exposed so that it may be inscribed with the desired information.

Figure 1D:
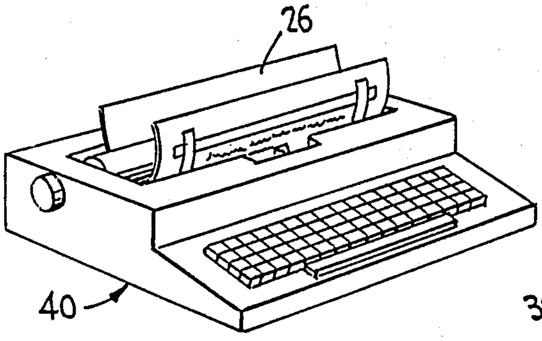

As seen in FIG. 1D, the sheet of paper with the sheet of metal foil secured thereto is then inserted in the usual manner into a conventional typewriter 40 having a conventional curved platen about which a sheet of paper is fed and positioned for typing. The sheet of paper with the foil secured thereto is fed about the platen in such a manner that the metal foil is positioned to be typed upon by the typewriter. The typewriter is provided with a ribbon which will cause a highly visible material to be deposited in the bottoms of the indentations formed in the metal foil when the keys of the typewriter are struck. (This material is preferably white) so as to provide the desired visual effect, and accordingly, conventional correction ribbon marketed for the purpose of whiting out mistakes may be employed in the typewriter in place of the standard ribbon. A conventional correction ribbon is, for example, one that was marketed by KO-REC-TYPE General Merchandising, of Brooklyn, New York. When a correction is to be made, a white powder or particulate material embodied in one longitudinally extending edge of the ribbon is typed over, rather than the black, ink portion of the ribbon, so that a black letter or numeral erroneously typed will be overlaid by white powder, and thus obscured. It will be understood that when ordinary typing strokes are made on the typewriter, permanent indentations will be made in the viewing surface of the sheet of metal foil, with material from the ribbon being deposited on the bottom of such indentations. The combination of the indentations with the white material deposited in the bottoms of the indentations produces a unique visual effect whereby the information may be readily perceived by the human eye.

Figure 1E:
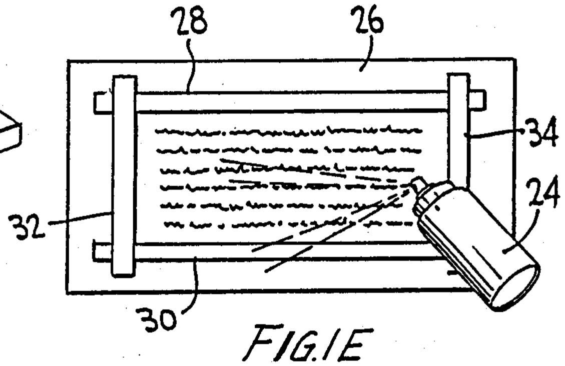
Figure 1F:
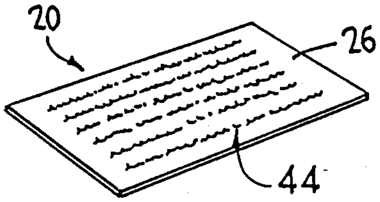

When the information has been typed on the sheet of metal foil, the sheet of paper along with the sheet of metal foil secured thereto is removed from the typewriter, and a further layer of fixative is applied to the inscribed surface of the sheet of metal foil. As shown in FIG. 1E, this is accomplished by again spraying the fixative onto the inscribed viewing surface of the foil using the spray can device 24. The fixative is then allowed to set for a period of about ten minutes The strips of tape 28, 30, 32 and 34 are then removed so that the sheet of metal foil can be separated from the sheet of paper as shown in FIG. 1F wherein the viewing surface 26 of the sheet of metal foil is provided with an inscription in the form of indentations indicated generally by reference numeral 44 formed in the central portion thereof.

Figure 1G:
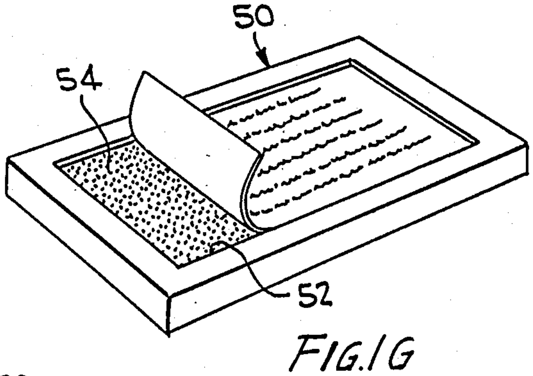

As seen in FIG. 1G a base 50 is provided for supporting the sheet of metal foil. This base may be formed of various materials such as wood, metal, plastic, glass and the like. The dimensions of the base may vary widely, and in the case of a wood base may have a length of about nine and one-half inches and a width of about four and one-half inches. The base may have a thickness of about five-eighths of an inch. The wood may be stained or otherwise colored to provide the desired effect. The sheet of metal foil is mounted on the upwardly facing surface of the base. The base is provided with a recessed central portion 52 in the upper surface for receiving the sheet of metal foil, or the upper surface of the base may be perfectly flat. A suitable adhesive substance such as silicone rubber 54 is provided in the bottom of recessed portion 52 or in the case of a flat upper surface, on an area corresponding to the dimensions of the foil sheet, for holding the sheet of metal foil in place. The sheet of metal foil is placed into the recessed portion, or onto the flat upper surface of the base if such a construction is employed, and is pressed into position. The silicone rubber ensures that the sheet of metal foil will not be wrinkled when put in place.

Figure 1H:
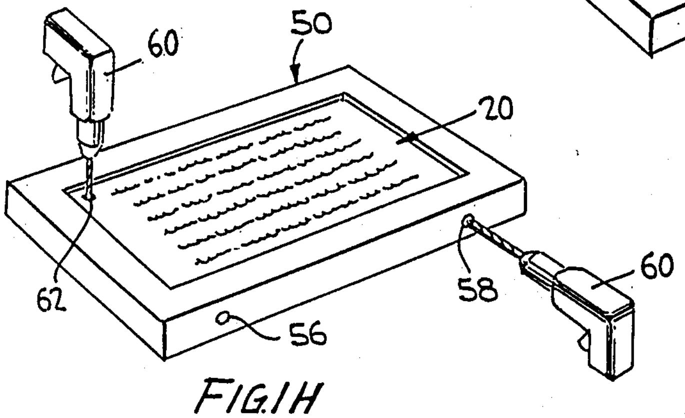
Figure 1I:
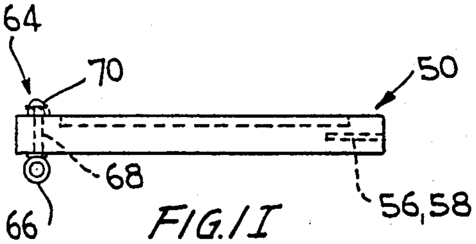

As seen in FIG. 1H, a pair of spaced holes 56 and 58 are formed in the lower edge of the base 50 by a conventional drill 60 for a purpose hereinafter described. In addition, a hole 62 is formed through the thicknesses of the base and sheet of foil by a drill. As seen in FIG. 1I, holes 56 and 58 extend only a short distance into the lower edge of the base. An attaching means indicated generally by reference numeral 64 is then affixed to and through the plaque. The attaching means comprises an eye bolt 66 having a threaded shank 68 which is inserted through the hole 62 with the outer end thereof extending above the top of the plaque. A decorative nut 70 is the threaded on the outer end of the eyebolt to secure the attaching means in place. Hole 62 is formed through the top left corner of the sheet. Screws with heads matching nut 70 may be inserted in pre-drilled holes in the remaining three corners of the foil if so desired.

Figure 1J:
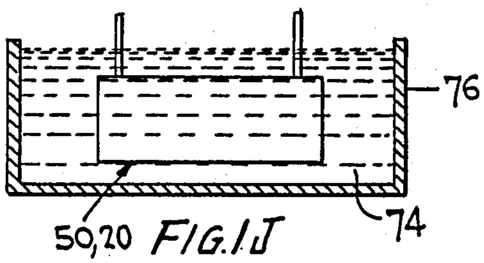

A layer of transparent protective material such as commercially available clear liquid plastic is then placed over the sheet of metal foil to protect the finished product. Preferably the entire plaque is encased within the protective material. This can be accomplished as shown in FIG. 1J by dipping the plaque into a bath 74 of plastic disposed within an open topped vessel 76 in a well known manner. The plastic may also be poured onto or brushed over the surface of the plaque. The plastic is then allowed to dry, and the plaque is in finished form.

Figure 2:
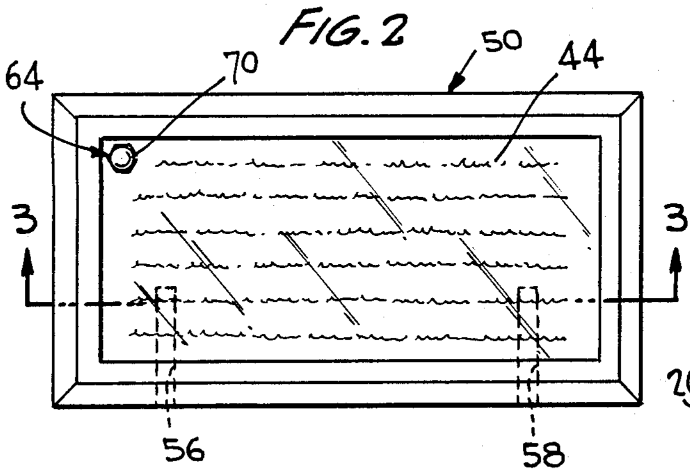
FIG. 2 is a plan view of the completed plaque.
Figure 3:
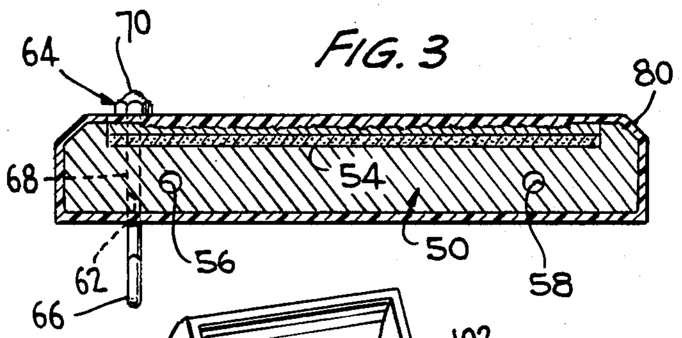
FIG. 3 is a cross-sectional view taken along line 3—3 of FIG. 2 looking in the direction of the arrows.
Figure 4:
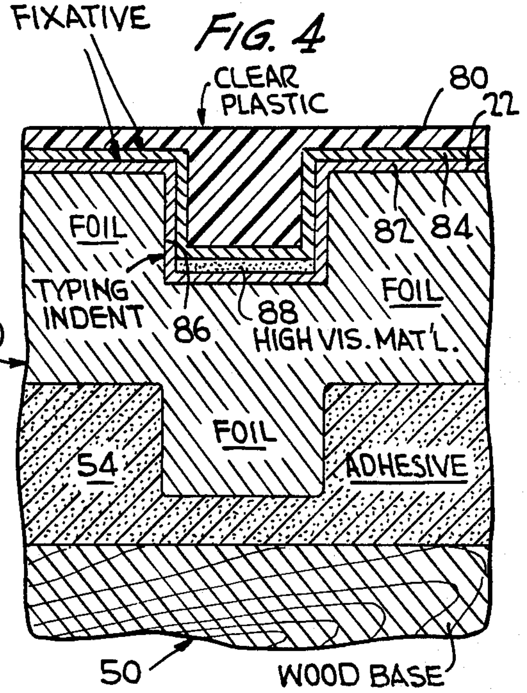
FIG. 4 is an enlarged view of a portion of the structure of FIG. 3 showing one of the indentations in the viewing surface of the sheet of metal foil.

Referring now to FIGS. 2–4 inclusive, the details of construction of the finished plaque are illustrated. As seen in FIG. 3, a layer of protective material 80 is disposed in surrounding relationship to the plaque with the attaching means 64 extending outwardly of such layer on opposite surfaces of the plaque.

As seen in FIG. 4, first and second layers 82 and 84 of fixative are disposed over the viewing surface 22 of the sheet of metal foil 20. A cross-section of an indentation 86 formed in the viewing surface is shown, (and a layer of highly visible material 88 from the ribbon of the typewriter is disposed in the bottom of the indentation, the layer 88 being interposed between the two layers 82 and 84 of fixative disposed within the indentation.) These layers of fixative are employed to ensure that the material from the ribbon of the typewriter is properly deposited on the viewing surface when the sheet of metal foil is typed upon, and the material is then retained in position when the clear plastic is provided to seal the plaque.

Figure 5:
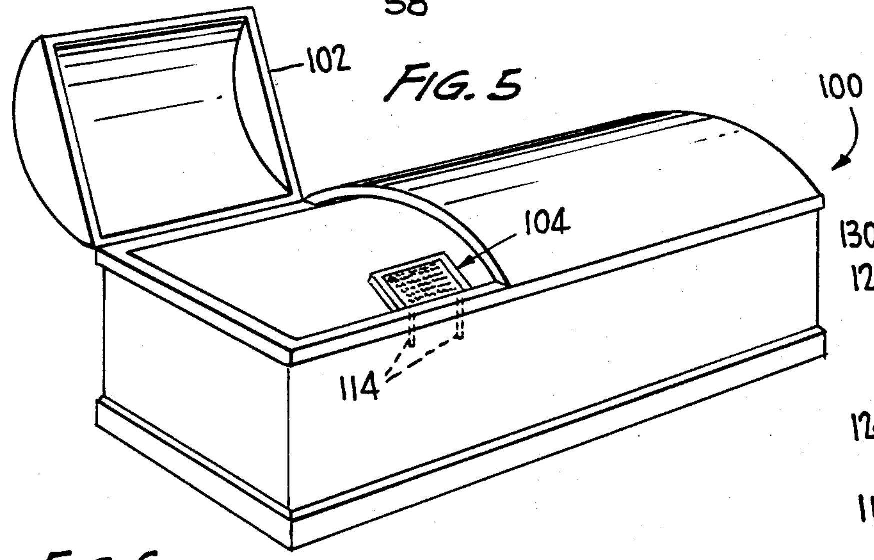
FIG. 5 is a perspective view showing the plaque mounted on a coffin.

Referring now to FIG. 5 of the drawings, a conventional coffin 100 is provided with a hinged top portion 102 which in its elevated position as shown in the drawing permits viewing of the remains within the coffin. A plaque 104 as described above is mounted in position on the coffin such that persons standing adjacent to the coffin can readily read the inscription on the plaque.

Figure 6:
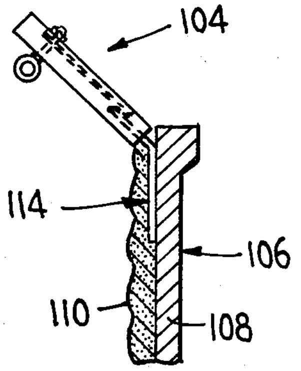
FIG. 6 is an enlarged view, partly in section, of a portion of the structure shown in FIG. 5, illustrating the manner in which the plaque is mounted in operative position.
Figure 7:
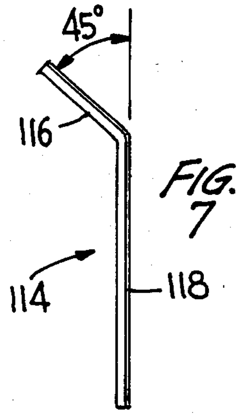
FIG. 7 is view of one of the mounting pins.

As seen in FIG. 6, the coffin includes a wall portion 106 including the rigid wall 108 having a soft, decorative lining 110 disposed on the inner surface thereof. The means for mounting the plaque in operative position comprises a pair of identical metal pins 114, one of which is shown in detail in FIG. 7. The pin includes an upper end portion 116 and a much longer lower end portion 118. In a typical example, the upper end portion may be about two inches in length, and the lower end portion may be about eight inches in length. The upper and lower end portions are disposed at an angle of about 45° to one another to support the plaque at the desired viewing angle. The upper end of the pin may be blunt, while the lower end of the pin is sharp.

In order to mount the plaque in operative position relative to the coffin, the upper ends of the pins may be placed in the holes 56 and 58 in the lower edge of the plaque. The lower ends of the pins are inserted in the wall portion of the coffin as shown in FIG. 6. These lower ends may be inserted directly into the lining or between the lining and the rigid wall of the coffin. Separate brackets could also be secured to the inside of the coffin to receive the pins if so desired. It is apparent that the mounting pins enable the plaque to be readily mounted in the desired position. Furthermore, when it is desired to close the coffin, the pins can be easily pulled from the wall portion of the coffin and from the holes in the base of the plaque.

Other means may be employed for supporting the plaque in operative position, if desired. For example, a pair of decorative metal rings may be attached at suitable positions on the rear surface of the base of the plaque. A pair of identical removable brackets are employed for supporting the rings of such a plaque.

Figure 8:
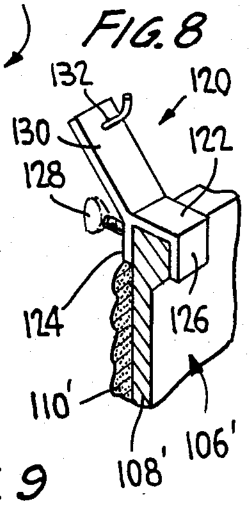
FIG. 8 is a perspective view showing a modified means for mounting the plaque in operative position.

Referring to FIG. 8, one of the removable brackets is indicated generally by reference numeral 120 and comprises a horizontal body portion 122 having integral depending leg portions 124 and 126 defining a downwardly facing U-shaped recess receiving the upper edge of the wall of the coffin. A thumbscrew 128 is threaded through a suitable threaded hole provided in leg 124 for engaging the inner surface of the side wall of the coffin. Portions of the coffin wall corresponding the those of FIG. 6 have been given the same reference numeral primed. The thumbscrew enables the bracket to be quickly clamped onto the upper edge of the coffin wall and removed therefrom. The bracket also includes a support portion 130 extending upwardly therefrom at an angle of 45° for supporting the plaque in viewing position. A hook 132 extends from portion 130 and is adapted to engage one of the rings on the plaque to hold the plaque in place. The pair of brackets 120 are spaced apart a distance corresponding to the spacing of the rings on the plaque.

Figure 9:
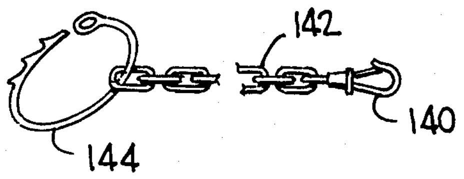
FIG. 9 is an illustration of the means for securing the plaque to the remains.

Referring now to FIG. 9 of the drawings, means for securing the plaque to the remains within the coffin is shown. A fastening means 140 in the form of a conventional locking clasp is connected to one end of a chain 142. Fastening means 120 is adapted to be connected to the eye bolt 66 which is secured to the plaque. The opposite end of the chain is in turn connected with a suitable locking bracelet 144 which may be secured to a portion of the remains such as the wrist of the deceased. The securing materials may be formed of, or plated by, indestructible metals.

The plaque can be of various sizes and materials. The typewriter permits selection of various fonts so that the the size and style of the characters presenting the information inscribed on the viewing surface may be selected. The base may be of various configurations ranging from a relatively simple shape to a decorative one depending on individual taste. It is also apparent that the plaque can also incorporate a photograph of the deceased as well as church affiliation if so desired. If a metal base were employed, metal brackets could be secured as by welding or cementing to the rear surface of the base for receiving the mounting pins. A ring-shaped bracket could be similarly secured to the rear surface to form the attaching means of the plaque.

The invention has been described with reference to a preferred embodiment. Obviously, modifications, alterations and other embodiments will occur to others upon reading and understanding this specification. It is my intention to include all such modifications, alterations and alternate embodiments insofar as they come within the scope of the appended claims or the equivalent thereof.

What is claimed is:

1. The method of making a plaque comprising, providing a thin sheet of metal foil having an upper viewing surface, applying a layer of fixative to said viewing surface, inscribing information into said viewing surface by forming indentations into said viewing surface, providing material of a high degree of visibility in the bottom of said indentations on said fixative so that the information may be readily perceived by the human eye, mounting said inscribed sheet on a base, and providing a layer of transparent protective material over the viewing surface of said sheet to permanently preserve the information while enabling an observer to read information through said protective layer.

2. The method as defined in claim 1, wherein the material applied to the bottom of said indentations is a white particulate material from a conventional typewriter correction ribbon.

3. The method of claim 1, including the step of applying a further layer of fixative to said viewing surface after providing said material in the bottom of said indentations.

4. The method as defined in claim 1 including the additional step of forming holes in said base for mounting the base in operative position.

5. The method as defined in claim 1 including the additional step of affixing an attaching means to said base for attaching the plaque to an object.

6. The method of making a plaque comprising, providing a thin sheet of metal foil having an upper viewing surface, applying a layer of fixative to said viewing surface, inserting said sheet of metal foil about the curved platen of a conventional typewriter, typing information onto said sheet by conventional typing strokes to form indentations into said viewing surface ad deposit material a high degree of visibility in the bottom of said indentations so that information may be readily perceived by the human eye, removing said sheet of metal foil from the platen of said typewriter, applying a further layer of fixative to said indented viewing surface, mounting said indented sheet on a base, and providing a layer of transparent protective material over the viewing surface of said sheet to permanently preserve the information while enabling an observer to read information through said protective layer.

7. The method of claim 6 including providing a ribbon in the conventional typewriter having white particulate material thereon which is deposited in the bottom of said indentations when said indentations are formed by a conventional typing stroke.

8. The method of claim 6 including the steps of securing the sheet of metal foil to a supporting sheet of material with said viewing surface facing away from said supporting sheet of material, the two secured sheets being inserted together into and removed from the platen of the typewriter, and the sheet of metal foil being separated from the supporting sheet of material after the sheets are removed from the typewriter and prior to the mounting of the sheet of metal foil on said base.

9. The method of claim 8 wherein said sheet of metal foil is secured to the sheet of backing material along peripheral portions thereof, leaving the central portion of the sheet of metal foil exposed to be indented and printed upon by the typewriter.

10. The method of claim 9 wherein adhesive tape is applied to the peripheral portions of the sheet of metal foil and adjacent portions of the supporting sheet of material.

11. The method of claim 6 including the additional step of forming holes in said base for mounting the base in operative position.

12. The method of claim 6 including the additional step of affixing an attaching means to said base for attaching the plaque to an object.

13. The method of making a plaque comprising, providing a thin sheet of metal foil having an upper viewing surface, transcribing information into said viewing surface by forming indentations in said viewing surface, depositing material of a high degree of visibility in said indentations so that the information may be readily perceived by the human eye, applying a layer of fixative to said material in said indentations to retain said material therein, mounting said inscribed sheet on a base, and providing a layer of transparent protective material over the viewing surface of said sheet to permanently preserve the information while enabling an observer to read information through said protective layer.

14. The method of claim 13, in which said material deposited in said indentations is a white powder.

15. The method of claim 14, in which said white powder is deposited from a typewriter correction ribbon.

16. The method of claim 13, including the steps of securing the sheet of metal foil to a supporting sheet of material with said viewing surface facing away from said supporting sheets, the indentations in said viewing surface being formed while said sheets are secured together, and separating said sheets after said layer of fixative has been applied to said viewing surface.

* * * * *